Feb. 13, 1934. J. J. HRUSKA 1,946,622
TIRE
Filed March 16, 1932 2 Sheets-Sheet 1
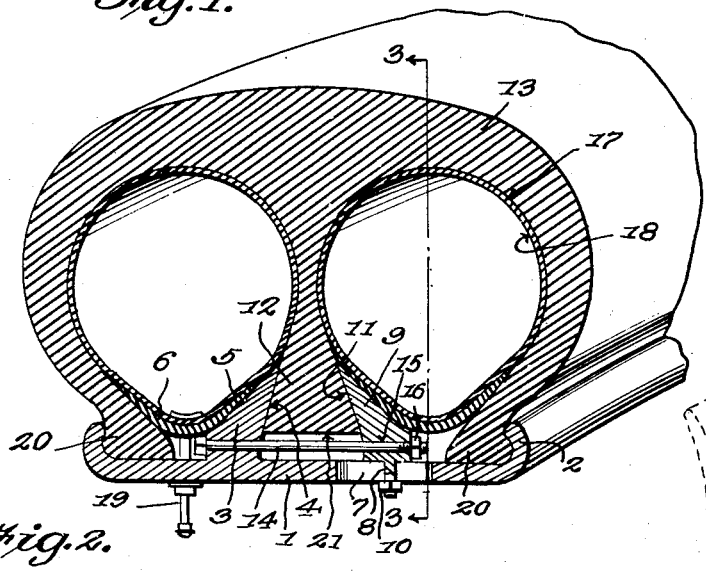
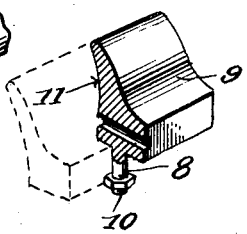
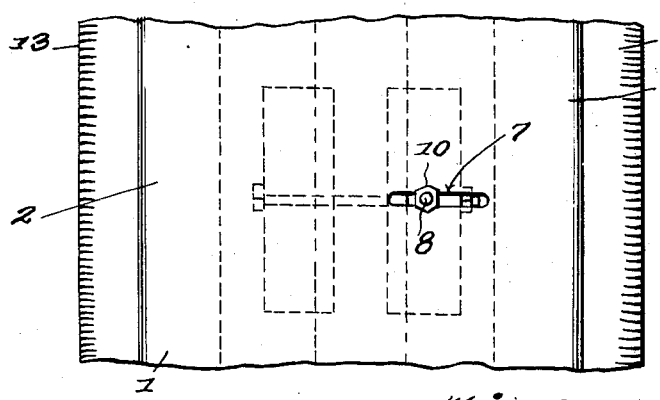
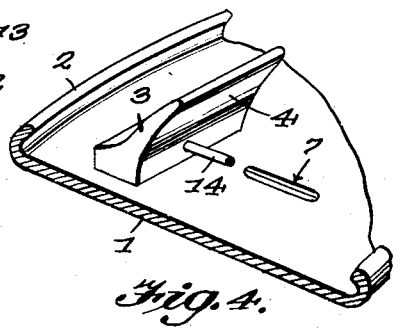
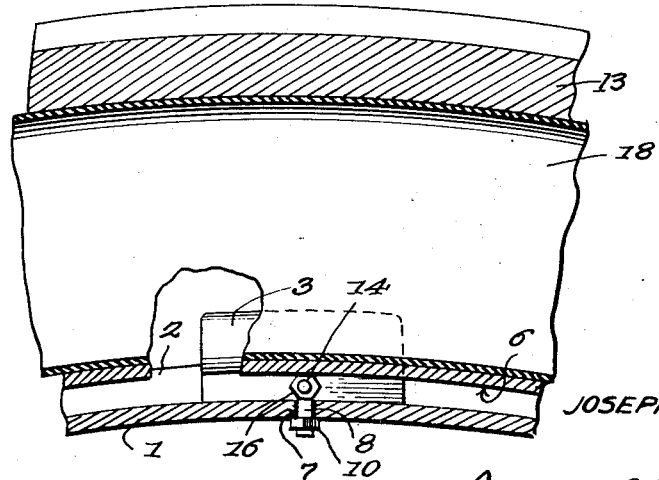
Inventor
JOSEPH J. HRUSKA Feb. 13, 1934.    J. J. HRUSKA    1,946,622
TIRE
Filed March 16, 1932    2 Sheets-Sheet 2
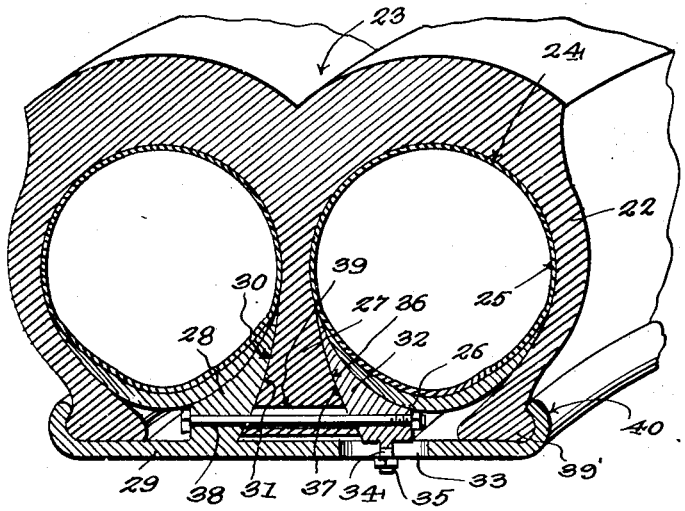
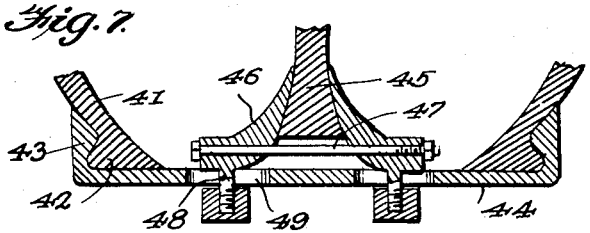
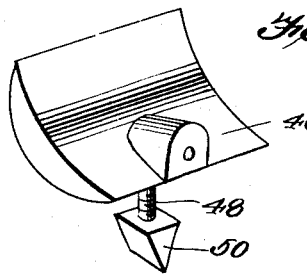
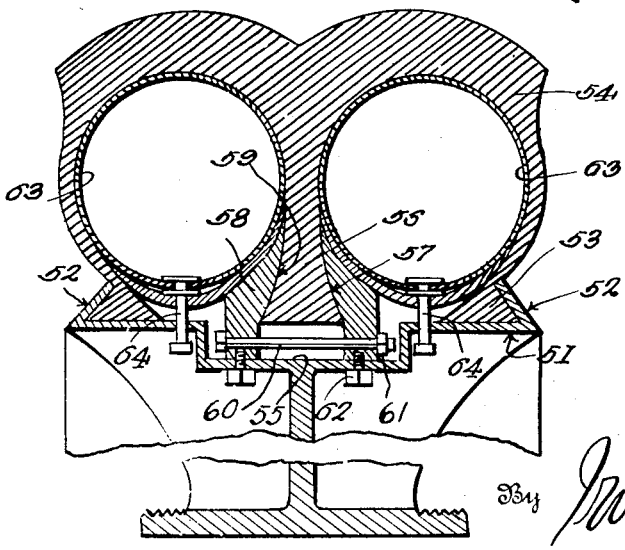
Inventor
JOSEPH J. HRUSKA Patented Feb. 13, 1934

1,946,622

UNITED STATES PATENT OFFICE 1,946,622

TIRE

Joseph J. Hruska, Milwaukee, Wis.

Application March 16, 1932. Serial No. 599,606

11 Claims. (Cl. 152—22)

This invention relates to automobiles and other tires, and has for its object the production of a simple and efficient multiple tube tire which is provided with means for facilitating the holding of the multiple tube tire firmly upon the rim or wheel itself against accidental displacement therefrom.

Another object of this invention is the production of a simple and efficient pneumatic tire which will permit a maximum flexibility and contact with the road, and which will reduce the hazards of skidding should one tube of the tire become punctured.

A still further object of my invention is the production of a simple and efficient pneumatic tire which is so constructed as to efficiently support a vehicle should one of the tubes become punctured and prevent the accidental skidding of the vehicle which is usually caused by a tire going flat.

Yet another object of this invention is the production of a tire which will possess the elements of safety, longer life, wider road grip, and strength, and at the same time will permit the car supported thereby to ride lower to the road.

A still further object of this invention is the production of a simple and efficient means for firmly securing the central rib of the tire to the rim so as to efficiently brace the tire at a point intermediate the longitudinally extending substantially parallel tube.

With these and other objects in view, this invention consists in certain novel constructions, formations and arrangements of parts as will be hereinafter fully described and claimed.

In the drawings:

Figure 1 is a transverse sectional view of the improved tire, certain parts of the tire and rim being shown in perspective;

Figure 2 is a top plan view of a section of the rim which is adapted to cooperate with the improved tire;

Figure 3 is a section taken on line 3—3 of Figure 1;

Figure 4 is a sectional perspective view of a portion of the rim and one of the clamping cleats carried by the rim;

Figure 5 is a sectional perspective view of one of the adjustable clamping cleats;

Figure 6 is a transverse sectional perspective view of a modified form of the invention;

Figure 7 is a transverse sectional view of a still further modified form of the invention;

Figure 8 is a detail perspective view of one of the adjustable cleats in the modified form shown in Figure 7;

Figure 9 is a still further modified form of the present invention, illustrating a structure employing a wheel without a rim, or where the rim forms an integral part of the wheel;

By referring to the drawings, it will be seen that 1 designates the rim which is provided with the usual rolled circumferential beads 2 which constitute tire retaining flanges of the usual type. The rim 1 is provided along its tire contacting face with a plurality of substantially wedge-shaped cleats 3 which are preferably formed integral with the rim, as shown in Figure 1. These cleats 3 are provided with a tire engaging face 4 which is inclined from the tip to the base of the cleats and is provided with an outer inclined face 5 which is adapted to engage the tube protecting strip 6. The rim 1 is also provided with a plurality of spaced transversely extending elongated slots 7, for the purpose of permitting the depending bolts 8 of the adjustable cleats 9 to be adjustably mounted within the slots 7 and be clamped therein by means of the clamping nuts 10. The adjustable cleats 9 are provided with inclined inner faces 11 which are adapted to engage the central heel 12 of the tire 13 similar to the inclined face 4 of the stationary cleats 3. This adjustable cleat 9 tapers toward its outer end and the inclined faces 4 and 11 of the respective cleats 3 and 9 will produce a substantially dove-tail socket into which a substantially dove-tail heel 12 of the tire 13 is adapted to fit, and in view of the fact that the outer ends of the stationary cleats 3 and the adjustable cleats 9 are drawn closer together than at their bases, the centrally located heel 12 will be firmly retained between the stationary cleats 3 and the adjustable cleats 9. In carrying out the invention, it should be understood that as many cleats may be employed as may be found necessary throughout the circumference of the wheel without departing from the spirit of the invention. Where wheels are used without rims, slots 7 are not necessary, because the hole for the bolt 8 will be always at the same place after the cleats are closed on the heel 12 by the nut 16 so the round hole will be sufficient to receive the bolt 8 to hold the cleats down.

Each stationary cleat 3 carries a transversely extending retaining bolt 14 which passes transversely through each stationary cleat 3 and is adjustably extended through the transversely extending apertures 15 of each adjustable cleat 9. A suitable retaining nut 16 is adjustably threaded upon each retaining bolt 14 in order to hold the cleat against accidental spreading.

In conjunction with the rim 1, there is preferably employed a tire 13, previously described, which is provided with a pair of parallel tube receiving channels 17 in which the pneumatic tubes are mounted. Suitable inflating valves 19 may be carried by the tubes 18 for the purpose of inflating the tube when desired. The tire casing 3 is provided with a pair of side heels 20 which are adapted to fit under the circumferentially extending tire retaining flanges 2, as shown in Figure 1. The central heel 12, previously described, is firmly clamped between the stationary cleats 3 and the adjustable cleats 9.

In assembling the device, the tubes are deflated. The central heel 12 is placed in first, and the cleats then adjusted. This will assist in holding the tire in true center. Then the tubes are inserted one after the other, and the outside heels are pushed into the rim. Then the tubes are inflated and the tire is ready for use.

From the foregoing description, it will be seen that a very simple and efficient means has been produced for providing a multiple tube tire, and particularly means for firmly holding the central dividing rib or heel in firm engagement with the rim 1. As shown in Figure 1, the central heel 12 of the tire casing may terminate short of the rim so as to cause the lower end 21 thereof to be arranged in spaced relation with respect to the adjoining face of the rim 1, thereby permitting a certain amount of elasticity or movement inwardly of the shoe 12 with respect to the rim 1. The inclined faces 4 and 11 of the respective cleats, however, in view of the substantial dove-tail arrangement will prevent the central heel 12 from jumping out from between the cleats by accident.

As shown in Figure 6, the tire casing 22 may be provided with a centrally located circumferentially extending groove 23 to simulate a double tire arrangement and to provide a longitudinally extending or circumferentially extending groove which will assist in holding the tire upon the road and constitute an efficient grip to prevent shimmying or wobbling of the wheel upon which the tire is mounted. In carrying out the invention, a modified form is shown in Figure 6, a plurality of substantially parallel channels 24 are provided within which the pneumatic tubes 25 are mounted. The usual protector shoes or strips 26 are also employed. The tire casing 22 is provided with a centrally located longitudinally extending rib or heel 27 which is substantially dove-tail in cross section, being flared outwardly near its outer ends. This substantially dove-tailed portion 27 is adapted to fit between the stationary cleats 28 which may be arranged in suitable number around the face of the rim or wheel 29 in a manner similar to that as shown in Figure 1. These cleats 28 are provided with curved inner faces 30 which are adapted to conform to the inner side faces 31 of the central heel or rib 27. An adjustable cleat 32 is slidably mounted upon the rim 29 through the medium of the transverse slot 33 in which works the bolt 34 upon which the nut 35 is mounted for clamping the adjustable cleat 32 in position. As stated with respect to the cleats 28, any number of these adjustable cleats 32 may be employed, and these adjustable cleats 32 are provided with curved inner faces 36 which are adapted to firmly grip the side face 37 of the central heel or rib 27. The adjustable cleats 32 are anchored against accidental displacement from the stationary cleats 28 through the medium of a retaining bolt 38. The centrally located rib or heel 27 may be provided with transversely extending apertures 39 for the purpose of receiving the retaining bolts 38 and this rib or heel 27 may be brought into close contact with the rim 29 or may be spaced therefrom without departing from the spirit of the invention, the apertures 39 being of sufficient size to permit the free movement of the heel 27 with respect to the retaining bolts 38. The tire casing 22 is provided with side heels 39' which are adapted to engage the side flanges 40 of the rim 29, as shown in Figure 6.

In Figure 7, there is shown a further modified form of the invention, wherein a tire 41 is illustrated, having the side heels 42 engaging the flanges 43 of the rim 44. The tire casing 41 is provided with a central heel or rib 45 which is substantially dove-tail shape in cross section, being flared outwardly or enlarged near its bottom as shown. In this form illustrated in Figure 7, a plurality of adjustable cleats 46 are employed which are normally held together through the medium of the retaining rod 47 and this rod primarily adjusts the cleats 46 into engagement with the heel 45. A tighter and more efficient adjustment may be obtained by moving the cleats 46 into further clamping engagement with the heel 45 in view of the fact that each adjustable cleat 46 is provided with a depending bolt portion 48 working in the longitudinally extending slots 49 in the rim 44, and the substantially wedge-shaped nuts 50 are threaded upon the bolts 48 to facilitate the firm clamping of the adjustable cleats 46 into an adjusted position. This wedge-shaped nut 50 will facilitate the gripping thereof by a tool, or by the fingers of an operator.

In Figure 9 there is shown a modified form of the invention illustrating a structure embodying a wheel which does not use a separate rim. In this structure illustrated in Figure 9, the tire casing 54 is directly mounted upon the wheel 51, which wheel 51 is provided with suitable flanges 52 for engaging the side heels 53. The wheel 51 is provided with a depressed channel portion 55, as shown in Figure 9, which channel portion 55 extends for a material distance across the transverse area of the wheel 51.

As shown in Figure 9, the tire casing 54 is provided with a central substantially dove-tail central heel 56. This central heel 56 is provided with outwardly flared walls 57, these walls flaring outwardly toward the ends of the heel 56, as shown in Figure 9. Clamping cleats 58 are mounted within the depressed channel 55 and these cleats 58 are provided with curved inner faces 59 for fitting snugly into engagement with the outwardly flared faces 57 of the heel 56. These cleats 58 are held together by means of a transversely extending securing bolt 60 which carries a nut 61 whereby the cleats 58 may be firmly clamped in engagement with the heel 56. The cleats 58 are secured firmly to the heel 56 and the nut 61 is adjusted upon the bolt 60 prior to placing the tire upon the wheel, and the tire is then placed upon the wheel so as to place the cleats 58 within the depressed channel 55. Suitable threaded pins or bolts 62 pass through the wheel or rim portion thereof, as shown in Figure 9, the inner ends of these threaded pins or bolts 62 engaging suitable threaded sockets formed in the inner ends of the cleats 58 and firmly anchoring these cleats 58 in engagement with the wheel. The heel portions 53 may then be fitted under the flanges 52 and the inner tubes 63 may then be inflated, the inflating valves 64 of the tube 63 extending through the rim portion of the wheel 51, as shown. In the structure shown in Figure 9, it should be understood that the cleats 58 need not be adjusted laterally since the same may be firmly secured to the heel 56 when placed in position and these cleats 58 may then be firmly anchored in engagement with the wheel by means of the securing bolts or pins 62, which pass through the wheel and are threaded into the cleats 58.

As is shown in Figure 9 the rim constitutes a portion of the wheel and is not a separate entity. In this view there is shown a conventional type of integral wheel and rim structure but it should be understood that it is not desired to limit this invention to any particular type of wheel, since a spoke type wheel may be substituted without departing from the spirit of the invention, the illustration in Figure 9 being only a conventional showing to illustrate one form of structure embodying a wheel in which the rim forms an integral or positively connected part.

It should be understood that certain detail changes may be employed without departing from the spirit of the invention so long as these changes fall within the scope of the appended claims.

It should be further understood that a very simple and efficient means has been provided for efficiently gripping the multiple tube tire casing, both upon its side edges and also centrally, so as to prevent the accidental jumping of the tire from the rim, and at the same time produce a very rigid connection between the tire and the rim. It should be further understood that should one of the pneumatic tubes become deflated, the other tube will be firmly held within its casing and will not lose its supporting power, and in this way will efficiently support the tire even though one of the tubes should become deflated. One tube is not permitted to extend or fill in the deflated channel which has been put out of service.

Through the medium of the present invention, should one of the tubes become deflated, the tire casing will be so supported upon the rim or wheel as to efficiently support the vehicle and prevent the same from accidentally skidding from side to side should one of the tubes become accidentally deflated. Through the medium of the present device, the complete deflation of the tire has been reduced to a minimum.

Having described the invention, what is claimed as new is:—

1. A device of the class described comprising a rim, a tire casing secured to said rim, said tire casing provided with a centrally located longitudinally extending heel, a stationary cleat secured to said rim and engaging one side face of said centrally located heel, and an adjustable cleat adapted to be clamped into engagement with said centrally located heel for firmly anchoring said centrally located heel in engagement with said rim.

2. A device of the class described comprising a rim, a tire casing supported thereon, said tire casing provided with a plurality of longitudinally extending channels, a centrally located longitudinally extending heel formed upon said casing and being substantially dove-tail in cross section and flaring outwardly toward its bottom, a stationary clamping cleat secured to said rim, and an adjustable clamping cleat adjustably mounted upon said rim and adapted to be brought into clamping engagement with said centrally located heel.

3. A device of the class described comprising a rim, a stationary cleat secured thereto and tapering and inclined toward its upper end, an adjustable cleat tapering and inclined toward its upper end, the upper ends of said cleats being arranged in close relation relative to their bases, a retaining rod connecting said stationary and adjustable cleats, said rim provided with a transversely extending elongated slot, said adjustable cleats protending with an extension bolt extending through said slot, and clamping means threaded upon said clamping bolt for locking said adjustable cleats in a set position upon said rim.

4. A device of the class described comprising a rim, a tire casing mounted upon said rim and provided with side retaining heels, a centrally located longitudinally extending rib formed upon said casing and provided with a heel flaring outwardly near its bottom, a stationary cleat, an adjustable cleat adjustably mounted for transverse movement upon said rim and adapted to clamp upon said centrally located rib for locking the same in engagement with said rim, a retaining rod carried by said stationary cleat and slidable through said adjustable cleat, and means carried by said adjustable cleat for locking said adjustable cleat in an adjusted position upon said rim.

5. A device of the class described comprising a rim, a tire casing mounted thereon, a centrally located rib, said rib being flared outwardly near its bottom, a stationary cleat, an adjustable cleat, said centrally located rib provided with an enlarged transversely extending aperture, an anchoring bolt carried by said stationary cleat and passing through said enlarged aperture and adjustably engaging said adjustable cleat, and means for locking said adjustable cleat in a set position upon said rim.

6. A tire and rim structure of the class described comprising a rim, a tire casing, a centrally located rib, said centrally located rib being flared near the bottom, adjustable cleats carried by said rim and engaging said centrally located rib for locking the same in engagement with said rim, and means carried by the side edges of said rim for engaging said tire casing, each adjustable cleat provided with a depending bolt, said rim provided with a plurality of transversely extending elongated slots, and wedge-shaped nuts threaded upon said bolt for locking said cleats in an adjusted position with respect to said rim.

7. A device of the class described comprising a wheel, said wheel provided with a circumferentially extending channel portion upon its outer face, a tire casing, means engaging the side edges of the tire casing for holding the same in engagement with said wheel, said tire casing provided with a centrally located longitudinally extending heel, tapering cleats engaging said longitudinally extending heel, a connecting bolt passing through said cleats for holding the same in engagement with said heel, anchoring pins passing through said wheel and engaging the inner ends of said cleats for anchoring said cleats firmly in engagement with said wheel, and inflatable tubes mounted within said casing.

8. A tire and retaining device therefor comprising a rim, a tire casing having side heels, said tire being provided with a longitudnally extendng centrally located heel, means carried by said rim for engaging the side heels of said tire casing, clamping means comprising clamping jaws extending into said tire upon opposite sides of said centrally located heel for clamping said centrally located heel therebetween, means for anchoring said clamping means upon said rim, and means for tieing said clamping means together and holding the clamping means from extending laterally of each other.

9. A device of the class described comprising a rim, a tire casing mounted thereon, said tire casing being provided with a plurality of longitudinally extending channels, an individual inflatable tube mounted within each channel, a centrally located rib dividing said channels and being flared outwardly near its bottom, a clamping member anchored upon said rim engaging one side of said centrally located rib and extending into one of said channels and a second clamping member adjustable with respect to said first mentioned clamping member and engaging the opposite side of said centrally located rib for locking said centrally located rib in clamped relation with respect to said rim.

10. A device of the class described comprising a rim, a tire casing mounted upon said rim and provided with a plurality of longitudinally extending channels arranged in substantial parallel relation, a centrally located retaining rib formed upon said casing, said casing being provided with a central longitudinally extending channel for simulating a pair of tires, clamping means engaging opposite sides of said centrally located rib, and extending into said channels and straddling said centrally located rib for locking the same in engagement with said rim, and means passing transversely of said clamping means for holding said clamping means against transverse spreading action.

11. A device of the class described comprising a wheel, said wheel having a circumferentially extending channel upon its outer periphery, a tire casing carried by the outer periphery of the wheel, means engaging the side edges of the tire casing for holding the same in engagement with the periphery of the wheel, said tire casing having a centrally located circumferentially extending heel, clamping cleats engaging said centrally located heel and seated within said circumferentially extending channel, means for anchoring said cleats within said circumferentially extending channel, and means passing trasversely of the cleats for firmly holding the cleats in binding engagement with the centrally located heel and also holding said cleats against transverse spreading movement.

JOSEPH J. HRUSKA.